Figure 1:
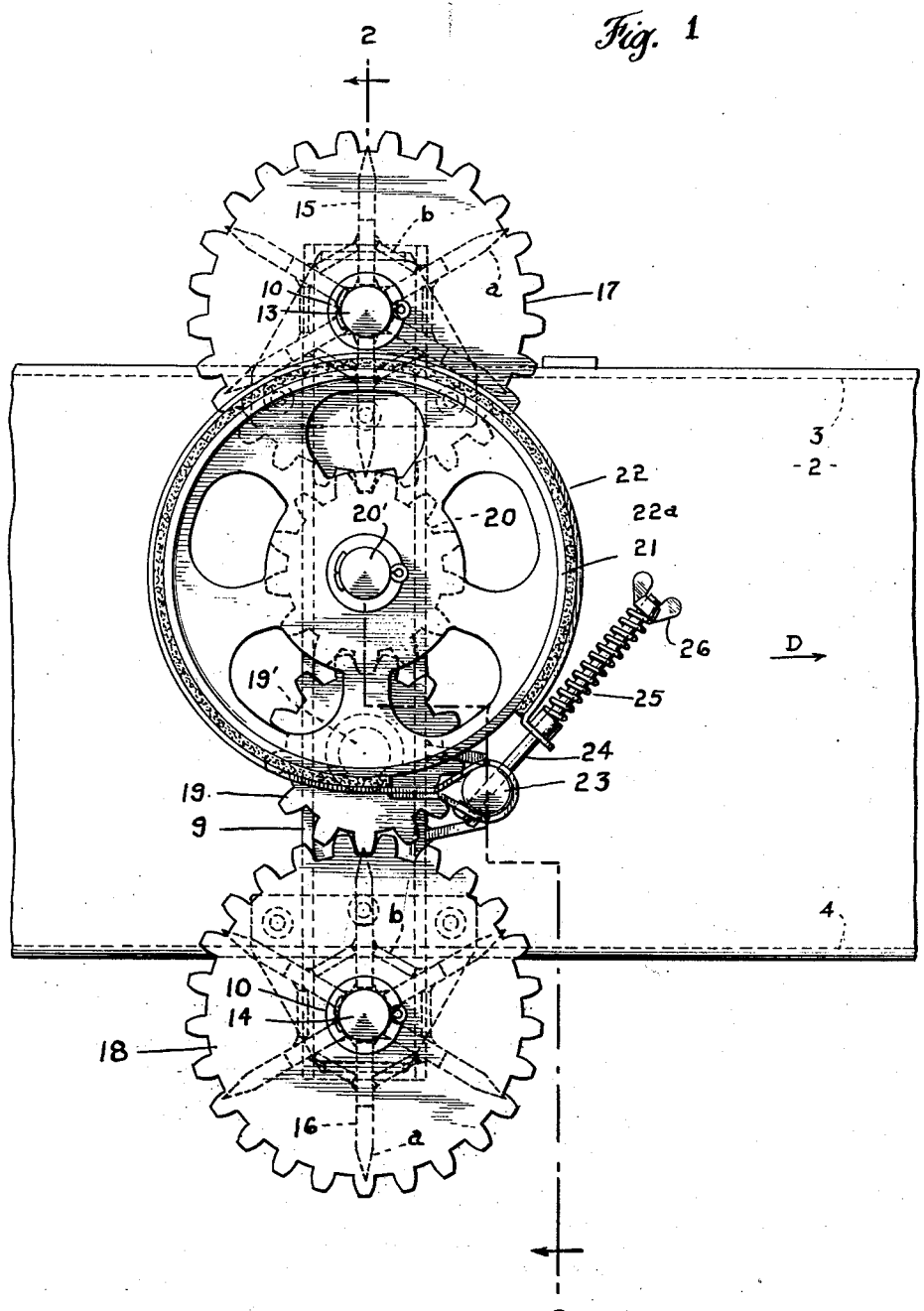

Aug. 17, 1954          E. B. NOLT          2,686,467
                   BALE TENSION REGULATOR
Filed July 31, 1952                        2 Sheets-Sheet 1

INVENTOR
Edwin B. Nolt
By Richard E. Babcock Jr.
ATTORNEY

Aug. 17, 1954 — E. B. NOLT — 2,686,467
BALE TENSION REGULATOR
Filed July 31, 1952 — 2 Sheets-Sheet 2

INVENTOR
Edwin B. Nolt
By Richard E. Babcock Jr.
ATTORNEY

Patented Aug. 17, 1954

2,686,467

UNITED STATES PATENT OFFICE 2,686,467

BALE TENSION REGULATOR

Edwin B. Nolt, New Holland, Pa., assignor to The New Holland Machine Division of The Sperry Corporation, New Holland, Pa., a corporation of Delaware Application July 31, 1952, Serial No. 301,863

1 Claim. (Cl. 100—179)

This invention relates to hay baling machines and more particularly to mechanism for regulating the bale tension in such machines.

Hay baling machines or balers generally include an elongated bale chamber in which the bale is formed, tied and then finally ejected through one end of the chamber. Each bale, as it is formed, is compressed or compacted against the bale just formed, the compressing force serving also to move the last mentioned bale toward the ejection or discharge end of the bale chamber. The density or compactness of the bales depends on the amount of resistance offered to the progress of the bales toward the discharge end of the bale casing.

Prior practice has been to create this resistance by suitable bale tension mechanisms which urge opposed members or portions of the casing against the bales at pressures which may be regulated as desired to obtain the desired degree of resistance to the discharge movement of the bales. Such prior mechanisms have necessarily depended for their operation upon frictional braking action between the bales and the components of the tensioning mechanisms. Inasmuch as the frictional characteristics of hay may vary within wide limits, depending on its location, time of cutting, moisture content, and other factors, it has been found that such prior mechanisms do not act uniformly on hay of such varying characteristics and therefore do not produce bales of uniform density from hay of varying characteristics.

With the foregoing in mind, it is the primary object of the invention to provide a bale tension mechanism which is capable of uniformly resisting the discharge movement of the successive bales, notwithstanding variations in the moisture content or other factors affecting the frictional characteristics of the hay in the different bales, to thus produce bales of uniform density. To this end, the mechanism of the invention utilizes bale retarding elements having a positive interlocking engagement with the respective bales.

It is a further more specific object to utilize such bale retarding elements in the form of opposed rotary members having radial projections which partially penetrate the bales passing between said elements, such partial penetration serving to positively interlock the bales and elements for movement together, and the force required for insertion and withdrawal of the projections serving to apply a substantially constant opposition to the discharge progress of the bales.

In addition, the invention contemplates interconnection of the rotary retarding members or elements for equal rotation, whereby to prevent canting of the bales.

Moreover, in accordance with a further object of the invention, equal braking forces are applied to the respective retarding members, preferably through a common braking mechanism in which the braking elements have substantially constant frictional characteristics. Included also in the invention concept is the adjustability of such braking forces so that uniform bales of varying density may be produced.

Figure 2:
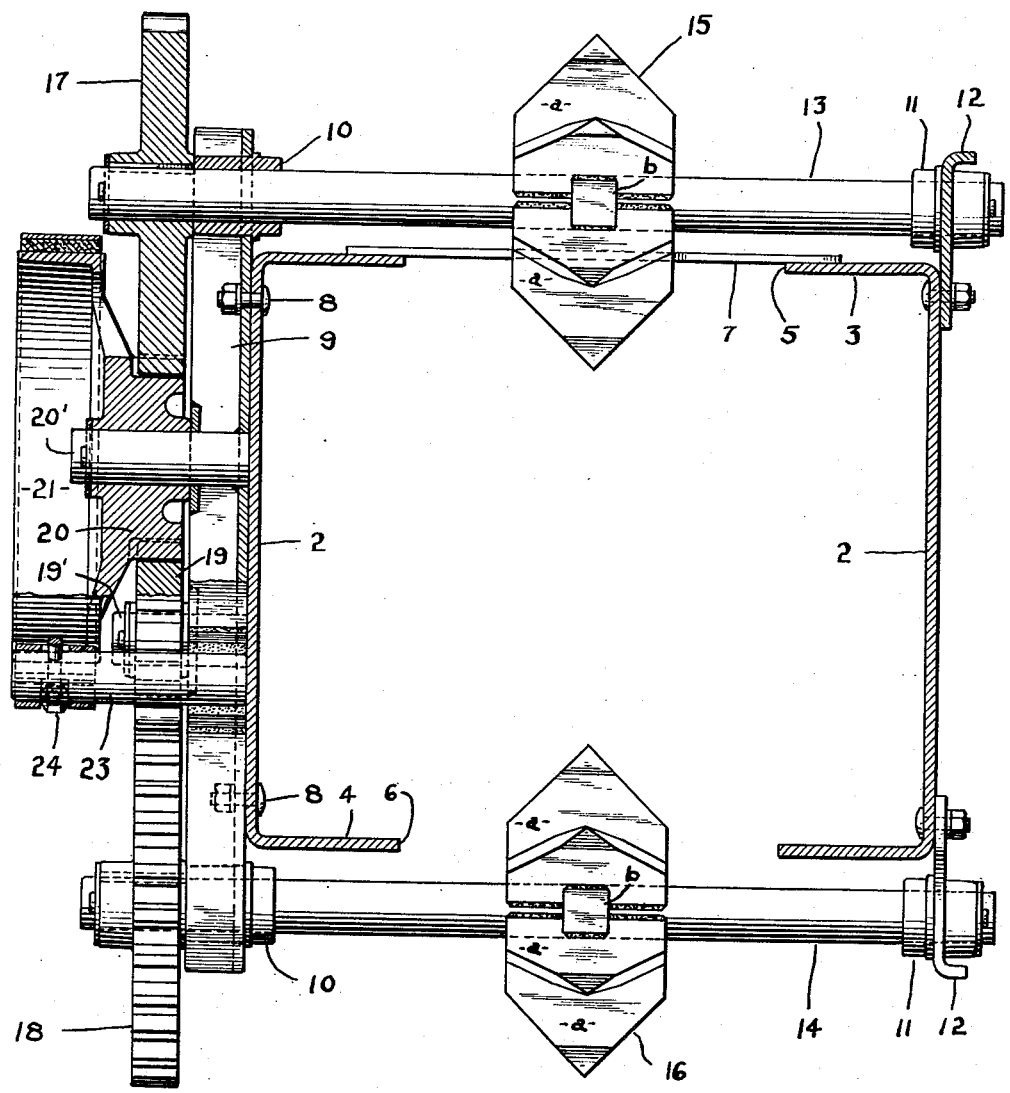

The foregoing, as well as other incidental objects and advantages are attained by the preferred embodiment of the invention illustrated in the accompanying drawings, in which:

Figure 1 represents a side elevation of a portion of a bale casing having the bale tensioning mechanism of the invention applied thereto; and, Figure 2, a somewhat enlarged cross-section on the line 2—2 of Figure 1, looking in the direction of the arrows.

Referring now in detail to the accompanying drawings, the invention is illustrated as applied to a conventional bale casing (illustrated fragmentarily) comprising the laterally opposed sides 2—2 and the vertically opposed top and bottom 3 and 4 respectively, together defining an elongated bale chamber of rectangular cross-section. The walls of the bale casing, in this case the top and bottom thereof, are formed with slots or openings 5 and 6 respectively at relatively opposed locations.

Bolts 8 secure a channeled structural member 9 in vertical position on one side 2 of the casing abreast of the openings 6—7, and this in turn supports bearings 10—10 respectively above and below the bale casing. Similar bearings 11—11 are supported on the other side of the bale casing in opposed relation to the respective bearings 10, by means of brackets 12—12.

Rotatably journalled across the top of the bale casing, in the upper bearing 10—11, is a shaft 13. A similar shaft 14 is journalled in lower bearings 10—11 across the bottom of the casing. The bale retarding elements or members of the invention, generally designated 15 and 16, are fixed on these respective shafts 13, 14 for rotation through the respective openings 5 and 6 to operatively engage opposite sides of a bale passing through the casing.

Each of the elements 15, 16 comprises a plurality of radial vanes or projections a arranged in any suitable manner to penetrate the bales to an appreciable depth and thus to interlock therewith to the end that discharge movement of the bales must result in rotary movement of the elements 15, 16.

In the preferred embodiment the vanes or projections a have pointed tips to facilitate their penetration of the bales, and extend in axial planes to present relatively large area surfaces for opposing the thrust of the bales. These vanes a are welded directly to their respective shafts 13 and 14 and are braced against deflection by reinforcing webs b welded between and connecting adjacent vanes.

In order that the resistance of the elements 15 and 16 to the discharge of the bales may be equalized for the purpose of facilitating equal compacting of both the top and bottom portions of the bales, and avoiding canting of the bales in the casing, means are provided for interconnecting the elements 15 and 16 to cause rotation of both at equal speeds.

Such means may comprise the gears 17 and 18 keyed on the respective shafts 13, 14. Interposed between these are the idler pinion 19, rotatably supported on a stub shaft 19' on channeled member 9, and the idler gear or pinion 20 rotatable on stub shaft 20' on the member 9. Pinion 19 meshes both with the gear 18 and the idler pinion 20, and the latter meshes with gear 17, whereby the shafts 13, 14 and their respective elements 15, 16 are caused to rotate in opposite directions at equal speeds.

The shape, arrangement and disposition of the vanes a is preferably such that the force required for their insertion into and withdrawal from the bales constitutes but a small and substantially constant portion of the total resistance normally offered to the bale discharge movement, and to this end the shape, size and number of the vanes a may be modified in various respects from the particular exemplification shown in the accompanying drawings. Additional means are provided for applying a drag or braking force in varying degrees to the respective elements 15 and 16, for the purpose of producing bales of any desired uniform density within a comparatively wide range.

I prefer to apply such braking or drag producing means in the form of a brake drum 21 integrally coaxially associated with the idler pinion 20, and a brake band 22 operatively disposed about the drum 21 with its brake lining 22a in frictional engagement with the periphery of the drum. One end of the brake band 22 is secured around an anchoring pin 23 fixed to the structural member 9, while the other end of said band 22 is resiliently drawn toward the anchored end thereof by means such as a bolt 24 passing through the anchoring pin 23 and its associated end of band 22 and disposed slidably through the free end of the band 22. A coil spring 25 disposed on the bolt 24 under compression between the free end of the brake band 22 and a wing nut 26 threaded on the bolt resiliently draws the brake band 22 about the drum 21 and maintains its brake band 22a in frictional engagement with the drum.

Axial adjustment of the wing nut 26 on the bolt may increase or decrease the compression of the spring 25 and the resulting frictional engagement of the brake band and drum. Thus the density of the bales may be varied within wide limits. However for any given setting of the adjusting nut 26, the resulting drag or braking action will be constant, inasmuch as the frictional characteristics of the conventional braking elements 21—22 remain substantially constant at all times. This will result accordingly in the function of bales of uniform degree of compactness, regardless of variation in moisture content or other qualities of the hay.

The overall operation of the invention, which is believed to be clear from the foregoing description, is summarized as follows: Bales in process of formation in the bale casing are compacted against previously formed bales, the compacting force tending to cause movement of the bales toward the discharge end of the bale casing, in the direction indicated by the arrows D in Figure 1. These bales, in order to be discharged, must pass between the opposed rotary elements 15—16, the radial vanes of which penetrate and interlock with the bales, the insertion and withdrawal of these vanes imposing a certain degree of substantially constant opposition to the movement of the bales. To this is added the braking action of the mechanism 21—22, which braking action may be manually regulated by adjustment of the wing nut 26. Due to the interconnection between the elements 15—16 as caused by the gear chain 17, 18, 19, 20, the braking action is equally imposed on each of the elements, and in addition both said elements are constrained to rotation in opposite directions at equal speeds.

In this application I have described only the preferred embodiment of the invention. However, I recognize that this invention is capable of other and different embodiments, and that its several details may be modified in various ways, all without departing from the said invention. Accordingly, the description and drawings are to be interpreted as merely illustrative in nature, and not as exclusive.

Having thus described the invention, I claim:

In a baler, an enlogated bale casing having opposed openings into its interior, shafts mounted on said casing for rotation across the respective openings about axes transverse to said casing, rotary bale retarding elements fixed on the respective shafts and having radial vanes disposed for rotation through the respective openings for penetrating engagement with and rotation by the bales passing through said casing, in combination with a train of gears interconnecting said shafts for simultaneous equal rotation, a brake drum rotatable with one of said gears, a brake band operatively disposed around said drum and anchored to said casing, and means for manually adjusting the tension of said band around said drum.

References Cited in the file of this patent

UNITED STATES PATENTS

| Number | Name | Date |
|---|---|---|
| 199,394 | Aldrich | Jan. 22, 1878 |
| 375,078 | Livengood | Dec. 20, 1887 |
| 668,129 | Kerns | Feb. 12, 1901 |
| 755,896 | Linthicum | Mar. 29, 1904 |
| 2,438,386 | Chamberlain | Mar. 23, 1948 |